United States Patent
Nagesh et al.

(10) Patent No.: US 7,440,404 B2
(45) Date of Patent: Oct. 21, 2008

(54) LOAD BALANCING METHOD AND APPARATUS FOR ETHERNET OVER SONET AND OTHER TYPES OF NETWORKS

(75) Inventors: Harsha S. Nagesh, New Providence, NJ (US); Viswanath Poosala, Basking Ridge, NJ (US); Dimitrios Stiliadis, Middletown, NJ (US); Peter J. Winzer, Tinton Falls, NJ (US); Martin Zirngibl, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 791 days.

(21) Appl. No.: 10/785,352

(22) Filed: Feb. 24, 2004

(65) Prior Publication Data

US 2005/0185584 A1 Aug. 25, 2005

(51) Int. Cl.
*H04L 12/16* (2006.01)
(52) U.S. Cl. ..................................... 370/235
(58) Field of Classification Search ................ 370/535, 370/542, 536, 412, 230.1, 231
See application file for complete search history.

(56) References Cited

U.S. PATENT DOCUMENTS

| | | | | |
|---|---|---|---|---|
| 5,841,760 A * | 11/1998 | Martin et al. | ............... | 370/242 |
| 6,134,246 A * | 10/2000 | Cai et al. | ................... | 370/474 |
| 6,396,847 B1 * | 5/2002 | Rezaie et al. | .............. | 370/468 |
| 6,553,035 B1 * | 4/2003 | Schwartz et al. | ............ | 370/412 |
| 6,956,874 B1 * | 10/2005 | Moore et al. | ................ | 370/535 |
| 6,975,649 B1 * | 12/2005 | Roberts et al. | .............. | 370/470 |
| 6,999,479 B1 * | 2/2006 | Jha | ............................ | 370/535 |
| 7,145,916 B2 * | 12/2006 | McNeil et al. | .............. | 370/458 |
| 7,164,658 B1 * | 1/2007 | Shenoy et al. | .............. | 370/254 |
| 2003/0128687 A1 * | 7/2003 | Worfolk et al. | ............. | 370/351 |
| 2004/0073640 A1 * | 4/2004 | Martin et al. | ............... | 709/223 |
| 2005/0089027 A1 * | 4/2005 | Colton | ....................... | 370/380 |
| 2005/0152354 A1 * | 7/2005 | Abel et al. | ................... | 370/389 |

OTHER PUBLICATIONS

I. Keslassy et al., "Maintaining Packet Order in Two-Stage Switches," Proceedings of IEEE Infocom, 10 pages, New York, 2002.
E. Blanton et al., "On Making TCP More Robust to Packet Reordering," pp. 1-11, Jul. 24, 2001.
S. Iyer et al., "Making Parallel Packet Switches Practical," Proceedings of IEEE Infocom, 8 pages, 2001.
C-S. Chang et al., "Load Balanced Birkhoff-Von Neumann Switches, Part II: Multi-Stage Buffering," pp. 1-23, Aug. 29, 2001.
S. Keshav et al., "Issues and Trends in Router Design," IEEE Communication Magazine, 15 pages, 1998.
C-S. Chang et al., "Load Balanced Birkhoff-von Neumann Switches, Part I: One-stage Buffering," Computer Communications, pp. 1-25, 2001.

(Continued)

*Primary Examiner*—Frank Duong

(57) ABSTRACT

A load-balanced network architecture is disclosed in which a traffic flow at a given network node is split into a plurality of parts, and the parts are distributed to respective ones of the plurality of nodes that are designated as participating in a load balancing process for the traffic flow. Each of at least a subset of the participating nodes receiving one of the parts routes at least a portion of its received part to one or more destination nodes.

19 Claims, 8 Drawing Sheets

OTHER PUBLICATIONS

L.G. Valiant, "A Scheme for Fast Parallel Communication," SIAM Journal of Computing, vol. 11, No. 2, pp. 350-361, 1982.

ITU-T Recommendation G.7042/Y.1305—Corrigendum 1, "Link Capacity Adjustment Scheme (LCAS) for Virtual Concatenated Signals," 16 pages, 2002.

ITU-T Recommendation G.7042/Y.1305, "Link Capacity Adjustment Scheme (LCAS) for Virtual Concatenated Signals," 24 pages, 2001.

ITU-T Recommendation G.707/Y.1322, "Network Node Interface for the Synchronous Digital Hierarchy," 184 pages, 2000.

* cited by examiner

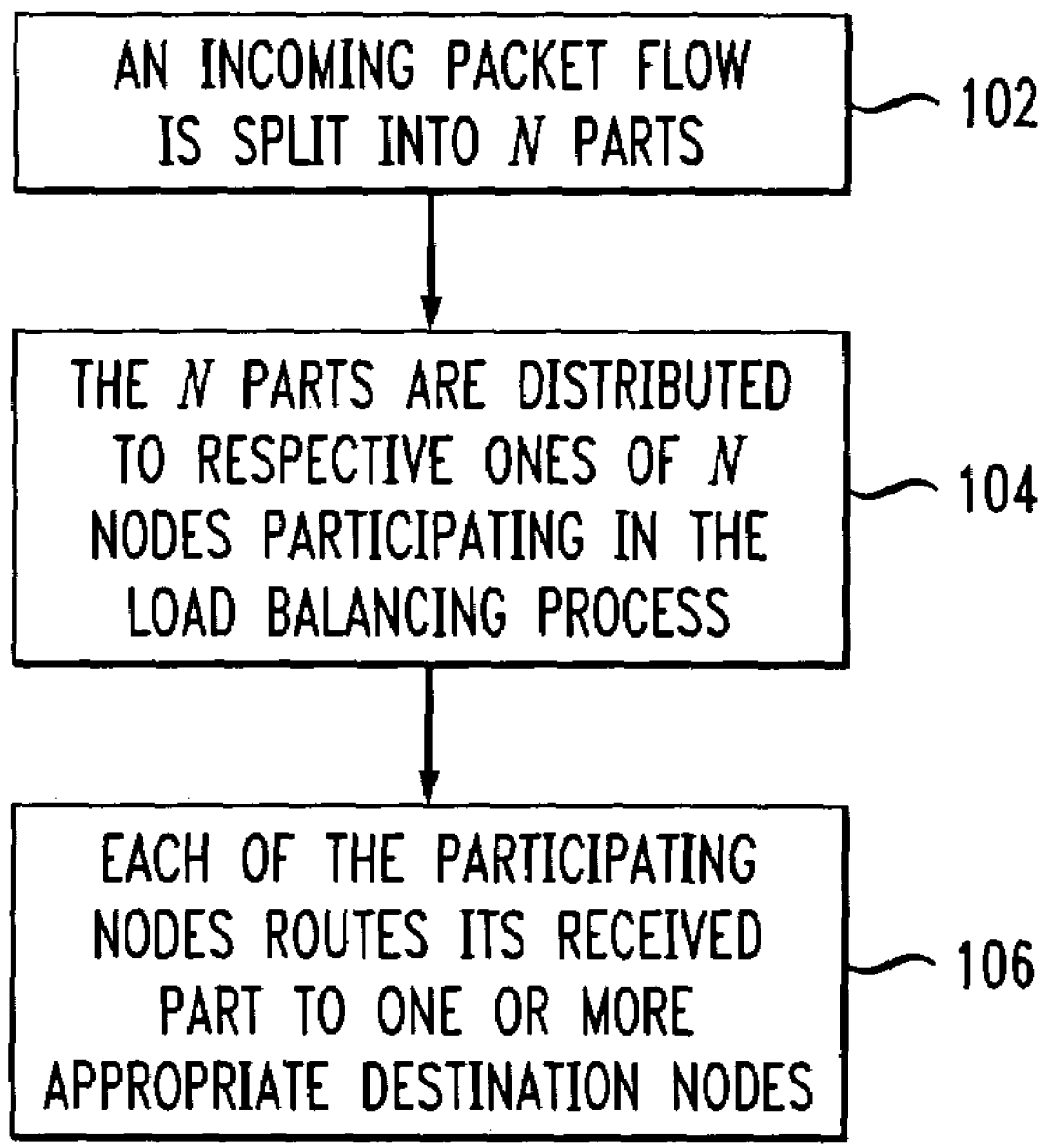

LOAD BALANCING METHOD AND APPARATUS FOR ETHERNET OVER SONET AND OTHER TYPES OF NETWORKS

FIELD OF THE INVENTION

The present invention relates generally to data communication networks, and more particularly to load balancing techniques for use in such networks.

BACKGROUND OF THE INVENTION

Circuit-switched network architectures, such as those based on synchronous optical network (SONET) or synchronous digital hierarchy (SDH) standards, were originally designed to support voice traffic using dedicated fixed-bandwidth connections. Although such networks are advantageous in that they incorporate substantial reliability and protection mechanisms, their primary disadvantage has been a lack of bandwidth efficiency.

Packet-switched network architectures, which include those based on asynchronous transfer mode (ATM) or Internet protocol (IP) standards, have traditionally been much better able than circuit-switched architectures to handle data traffic. Since data traffic is inherently bursty, it leads to underutilization of the fixed-bandwidth connections of conventional circuit-switched networks. Packet-switched network architectures provide the benefits of statistical multiplexing, which allows for better handling of bursty data traffic.

Recently, virtual concatenation (VC) and link capacity adjustment scheme (LCAS) protocols have been developed which allow more efficient use of the existing fixed-bandwidth connections associated with circuit-switched SONET/SDH network infrastructure. For example, these protocols are utilized in transmission of Ethernet over SONET (EoS) data traffic over metropolitan networks, and in numerous other data transmission applications. The VC and LCAS protocols are described in greater detail in, for example, ITU-T standards documents G.707 and G.7042, respectively, both of which are incorporated by reference herein.

Virtual concatenation generally allows a given source node of a network to form a virtually-concatenated group (VCG) which includes multiple members each associated with a corresponding data stream. The different data streams may then be transmitted over diverse routes through the network from the source node to a given destination node. The destination node recombines the streams to reconstruct the original VCG.

The LCAS protocol enhances the basic virtual concatenation functionality described above by allowing so-called "hit-less" addition and deletion of members from a VCG, that is, addition and deletion of members without the introduction of errors into the transmitted data. The LCAS protocol also enables a VCG to operate at a reduced capacity after the failure of routes associated with one or more members, by allowing the temporary removal of members associated with failed routes from the VCG.

Despite the improvements associated with the recently-developed VC and LCAS protocols, there remain problems in both circuit-switched and packet-switched network architectures. Generally, existing architectures can be difficult to scale so as to accommodate large mesh topologies, and can still suffer from bandwidth efficiency or switching complexity concerns. For example, an architecture comprising an IP overlay over SONET may require an excessive amount of link bandwidth, while a pure IP network architecture will typically require a large amount of packet switching capacity at each network node.

Accordingly, a need exists for an improved network architecture that can provide bandwidth efficiency without requiring high packet switching capacities at each node.

SUMMARY OF THE INVENTION

The present invention addresses the above-noted need by providing improved techniques for processing one or more traffic flows in a communication network that comprises multiple nodes.

In accordance with one aspect of the invention, a load-balanced network architecture is disclosed in which a traffic flow at a given network node is split into a plurality of parts, and the parts are distributed to respective ones of the plurality of nodes that are designated as participating in a load balancing process for the traffic flow. Each of at least a subset of the participating nodes receiving one of the parts routes at least a portion of its received part to one or more destination nodes. The traffic flow may comprise, by way of example, an incoming packet flow arriving at a given one of the nodes. The traffic flow is split into the plurality of parts in a manner independent of the particular destination node or nodes that may be associated with that flow.

An illustrative embodiment of the invention comprises a communication network having N participating nodes. An incoming packet flow of rate R at a given one of the network nodes is split into N substantially equal parts, each having a rate of R/N. The N parts of the incoming packet flow are distributed to respective ones of the N participating nodes, such that each of the N participating nodes receives a corresponding one of the N parts. Pre-provisioned circuits, each configured to support a rate of R/N, are used to distribute the parts to the various participating nodes. Each of the pre-provisioned circuits is thus used to transport one of the N parts of the split packet flow.

In accordance with another aspect of the invention, a given one of the participating nodes routes at least a portion of its received part to a set of destination nodes that are determined based on destination addresses in packet headers of the portion. If the packet header of a given packet in the part of the flow received by a given one of the participating nodes indicates that the participating node is a final destination node for that packet, the packet is stored in a resequencing buffer of the participating node. Alternatively, if the packet header of a given packet in the part of the flow received by a given one of the participating nodes indicates that the participating node is not a final destination node for that packet, the packet is stored in a particular one of a plurality of output queues of the participating node that is associated with the final destination node for the packet.

Advantageously, the network architecture in the illustrative embodiment provides enhanced bandwidth efficiency without requiring high packet switching capacities at each node, and thereby facilitates the implementation of large-scale networks for EoS data traffic or other types of traffic flows.

BRIEF DESCRIPTION OF THE DRAWINGS

FIG. 1 is a flow diagram of a load balancing process in an illustrative embodiment of the invention.

DETAILED DESCRIPTION OF THE INVENTION

Figure 2A:
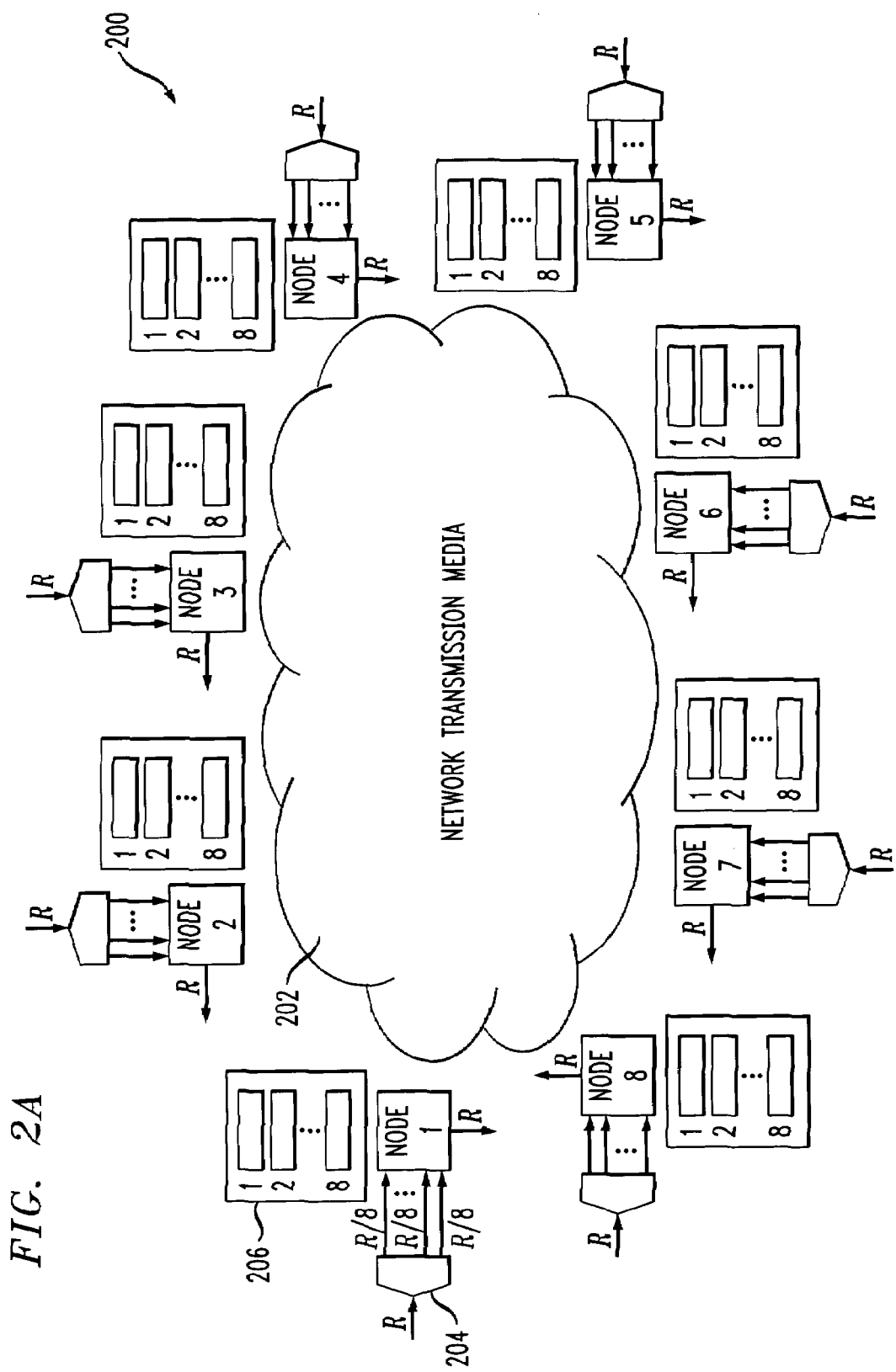
FIGS. 2A through 2F show views of an example network architecture implementing a load processing process of the type described in conjunction with FIG. 1.

The invention will be illustrated herein in conjunction with an illustrative embodiment in which an improved network architecture is provided. The improved network architecture, an example of which will be described in conjunction with FIGS. 2A through 2F, utilizes a load balancing process that will be described in conjunction with the flow diagram of FIG. 1. It is to be appreciated, however, that the invention is not limited to the particular network architecture and associated load balancing process of the illustrative embodiment, but is more generally applicable to any network application in which it is desired to provide improved routing performance with reduced complexity.

Although well suited for use with EoS data traffic, with or without virtual concatenation, the invention can be used with any type of traffic flow.

Referring now to the flow diagram of FIG. 1, a load balancing process in an illustrative embodiment of the invention will be described. The process in this example includes steps 102, 104 and 106. It will be assumed for purposes of simplicity and clarity of illustration that the network comprises N nodes, each of which needs to each support an ingress and egress traffic rate of R. The variable N is an arbitrary number that can take on any desired value consistent with the practical constraints of a given implementation.

In step 102, an incoming packet flow of rate R at a given network node is split into a plurality of parts, more specifically denoted as N parts. The incoming packet flow of rate R is split into its N parts in a manner that is independent of the particular destination node or nodes that may be associated with that packet flow.

In step 104, the N parts of the incoming packet flow are distributed to respective ones of N nodes participating in the load balancing process. Thus, each of the N participating nodes in this example receives a corresponding one of the N parts. The distribution of the parts to the various participating nodes, other than the given node at which the flow splitting occurs, preferably takes place over pre-provisioned circuits each configured to support a rate of R/N. Each of the pre-provisioned circuits is thus able to transport one of the N parts of the split packet flow.

The participating nodes to which parts of a split packet flow are distributed are also referred to herein as "intermediate" nodes. Certain of these intermediate nodes may also correspond to destination nodes, which may be final destination nodes.

In step 106, each of the participating nodes routes its received part to one or more appropriate destination nodes.

The splitting of a given flow may be a substantially equal split, which involves splitting the flow into a plurality of equal or substantially equal parts, as in the above-noted situation in which each of N parts of a rate-R flow has a rate of R/N, or may be a non-equal split, which involves splitting the flow into a number of non-equal parts. Various combinations of equal and non-equal flow splitting may be used, and different nodes in the network may utilize different types of flow splitting.

In addition, the flow splitting may be performed at a packet level, independent of the final destination node of the packet, so as to facilitate the handling of variable-length packets. Other types of flow splitting may be used.

A more particular example of the load balancing process of FIG. 1 will now be described in conjunction with the network architecture shown in FIGS. 2A through 2F.

Referring initially to FIG. 2A, an example network 200 is shown. The network 200 comprises eight nodes, generally denoted 1, 2, ... 8, which are configured to communicate over network transmission media 202. Each of the nodes is assumed to support an ingress and egress traffic rate of R, as in the previous example. Associated with each of the nodes is at least one corresponding flow splitter 204 and a corresponding set of virtual output queues (VOQs) 206. A given one of the sets of VOQs includes a separate queue for each of the eight nodes. Although the flow splitters 204 and VOQ sets 206 are shown as being separate from their corresponding nodes 1, 2, ... 8, this is for purposes of simplicity and clarity of illustration, and each node 1, 2, ... 8 may be implemented so as to incorporate therein its associated flow splitter 204 and VOQ set 206. A node of this type will be described in greater detail below in conjunction with FIG. 3. Numerous other node implementations are possible.

Figure 2B:
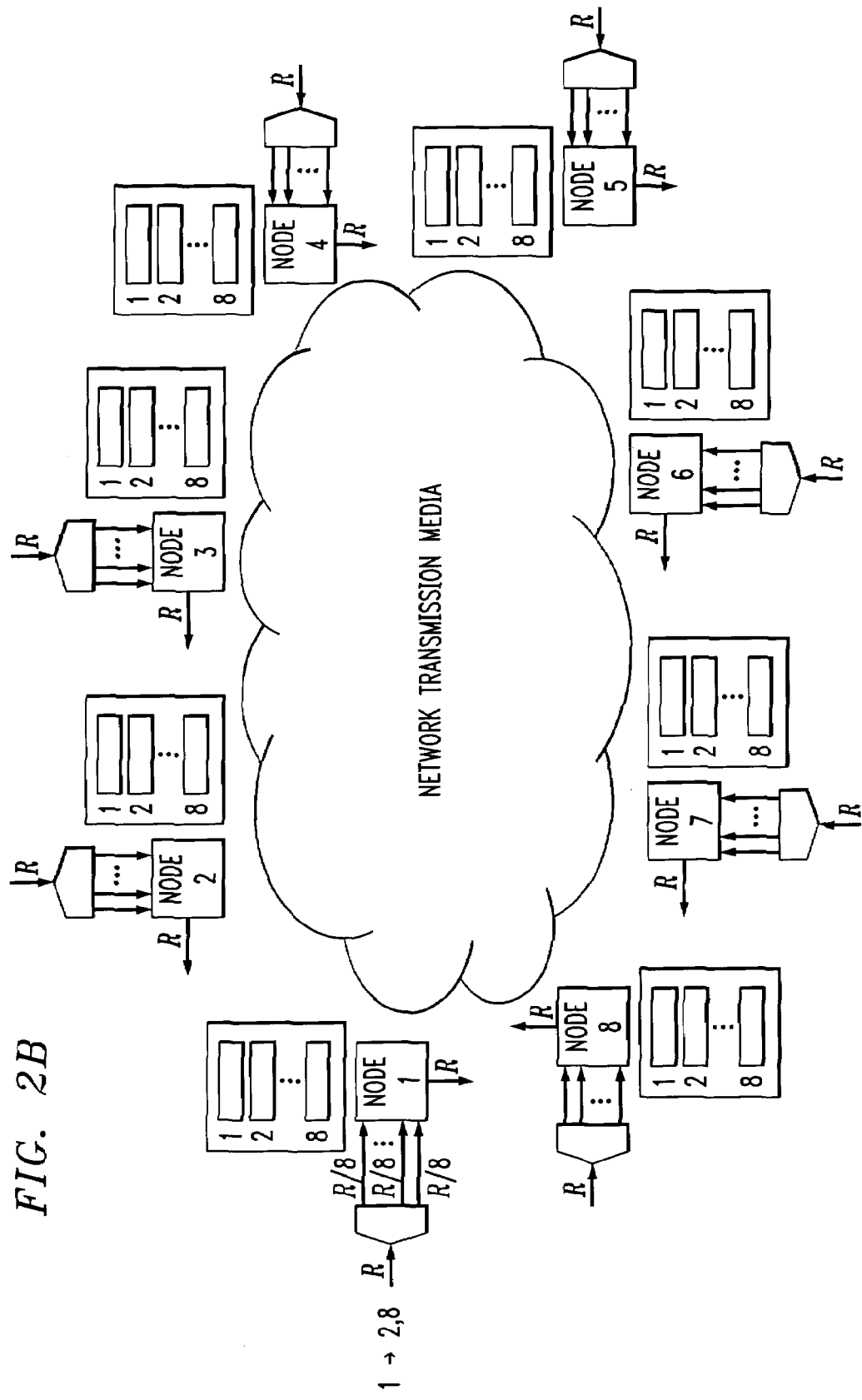

FIG. 2B shows the arrival of an incoming packet flow at node 1, to be routed to destination nodes 2 and 8.

Figure 2C:
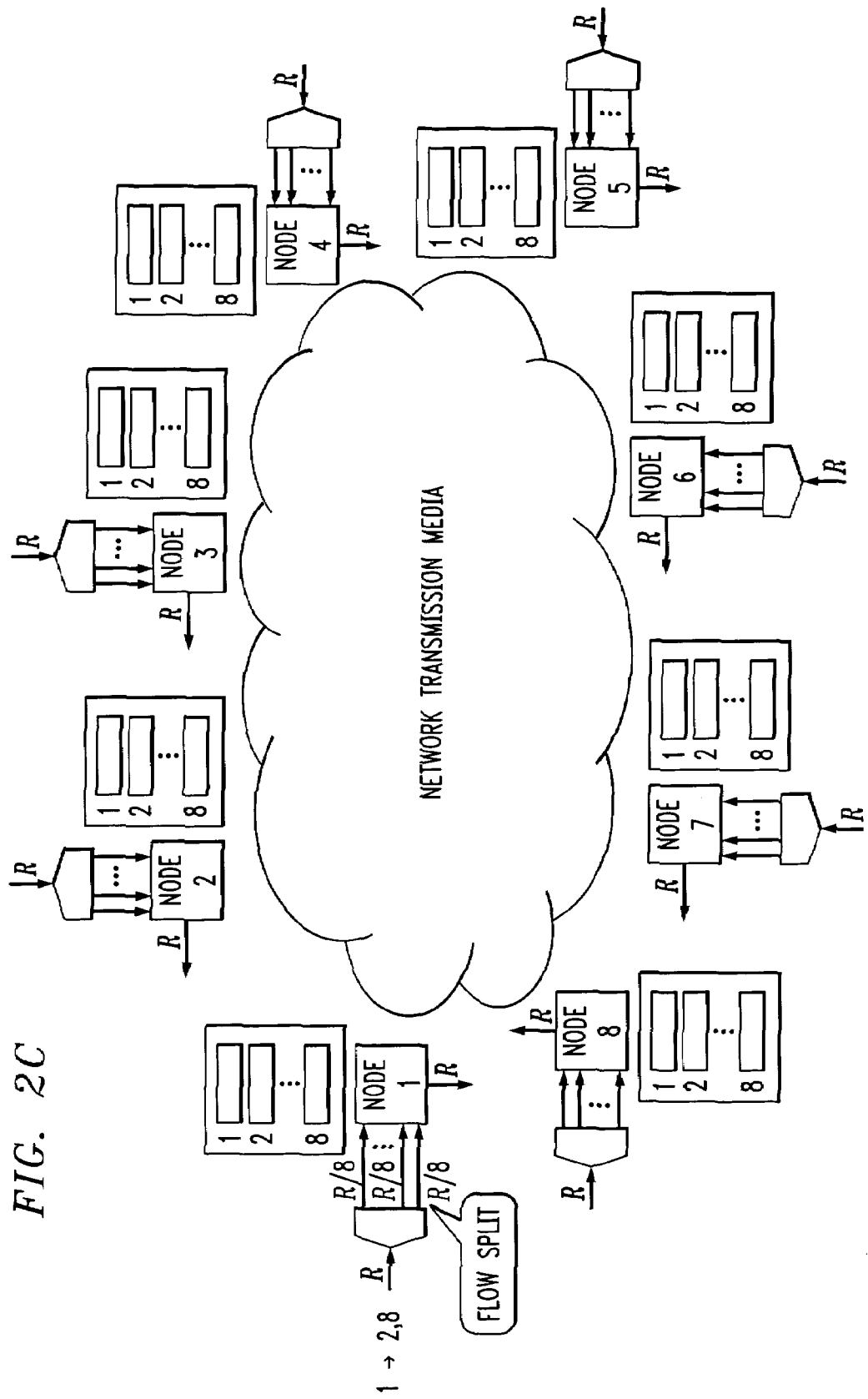

As shown more clearly in FIG. 2C, the incoming rate-R packet flow at node 1 is split via the associated flow splitter into eight substantially equal-rate parts of rate R/8.

The flow splitting may be achieved, by way of example, by maintaining N queues at each of the nodes and filling the queues utilizing a round-robin technique, shortest queue first technique or other type of queue-filling technique. Such queues and corresponding control logic may be implemented in a node memory or as a separate device coupled to or otherwise associated with a given node. It is also possible to utilize the above-noted VC and LCAS protocols, or other virtual concatenation techniques or straightforward modifications thereof, to implement the desired flow splitting. It should be noted that use of certain conventional virtual concatenation techniques would provide flow splitting at a byte level, and thus may not be directly utilizable in the illustrative embodiment without suitable modification to ensure that the desired packet format is maintained after splitting of the flow.

Figure 2D:
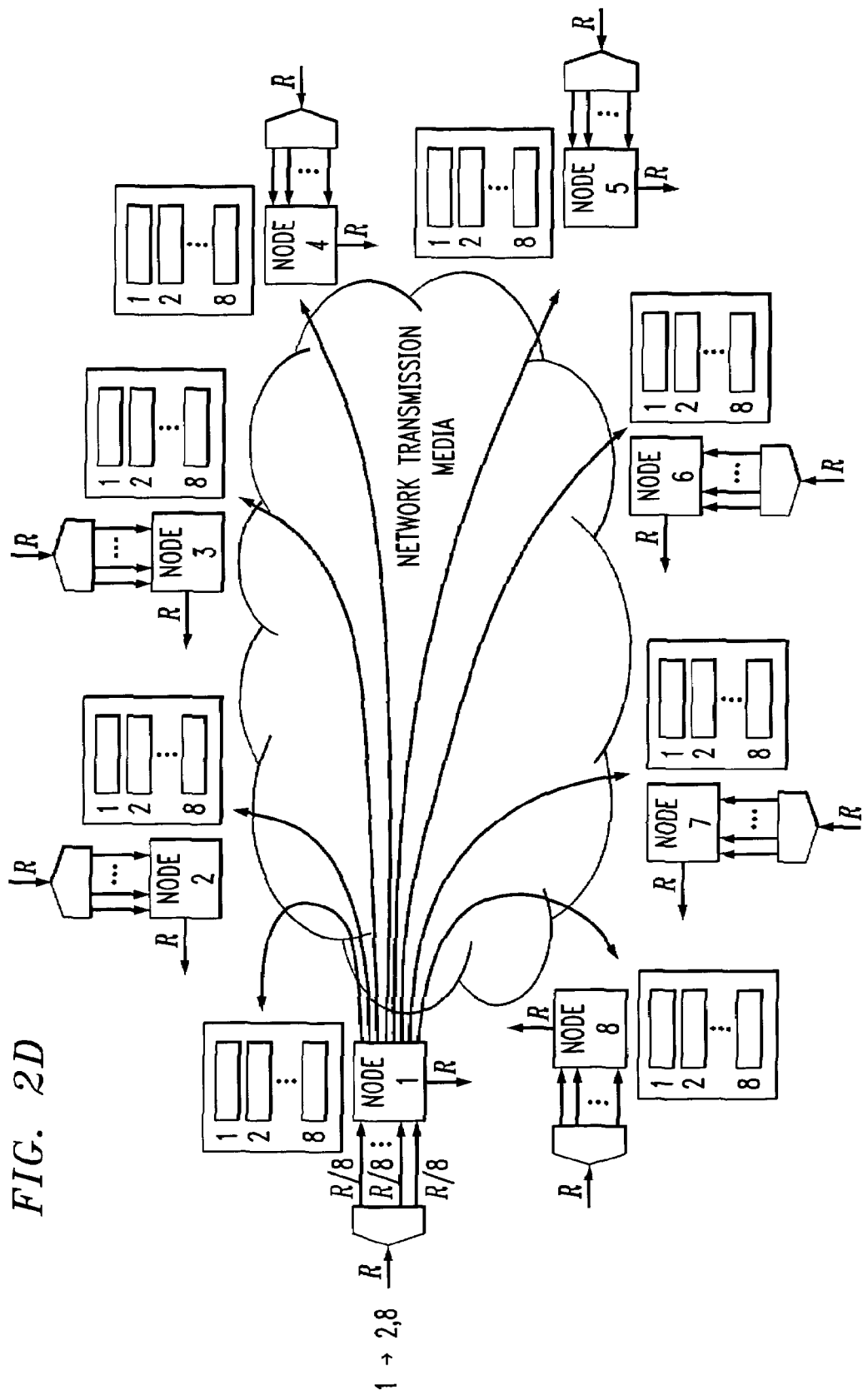

Subsequent to the flow split, the various parts of the flow are distributed to respective ones of the participating nodes. In this example, the eight parts, each of rate R/8, are distributed to respective ones of the eight nodes, as illustrated in FIG. 2D. Thus, one of the parts remains at node 1, although it may be viewed as being "distributed" to that node, as this term is intended to be construed generally herein. The distribution of the various parts to nodes 2 through 8 is preferably implemented using pre-provisioned circuits of rate R/8, although other types of distribution may be used. The pre-provisioning of circuits for distributing the various parts of a split flow may be implemented using conventional techniques of a type well known to those skilled in the art, and advantageously avoids the need for real-time circuit setup responsive to changing traffic patterns.

Figure 2E:
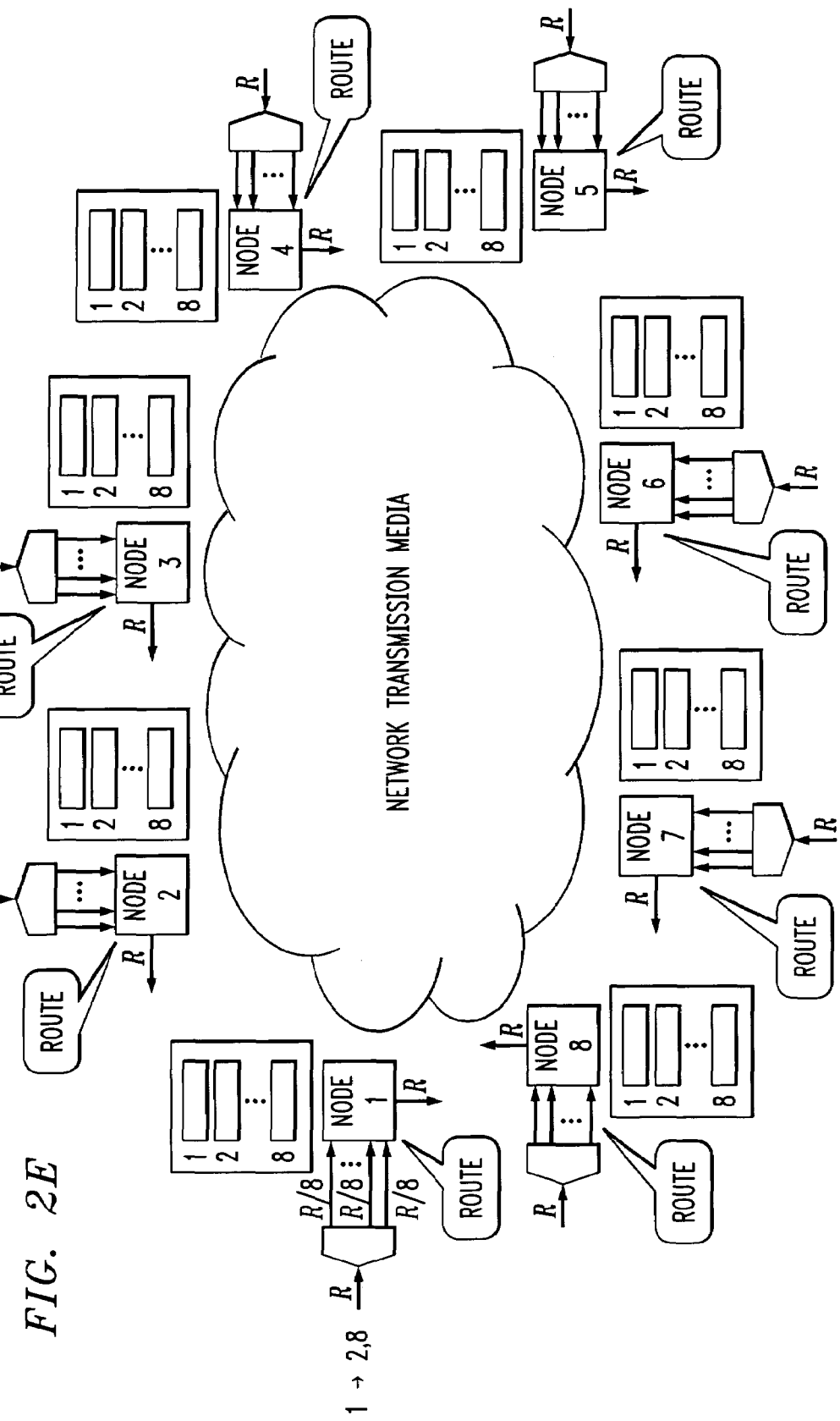
Figure 2F:
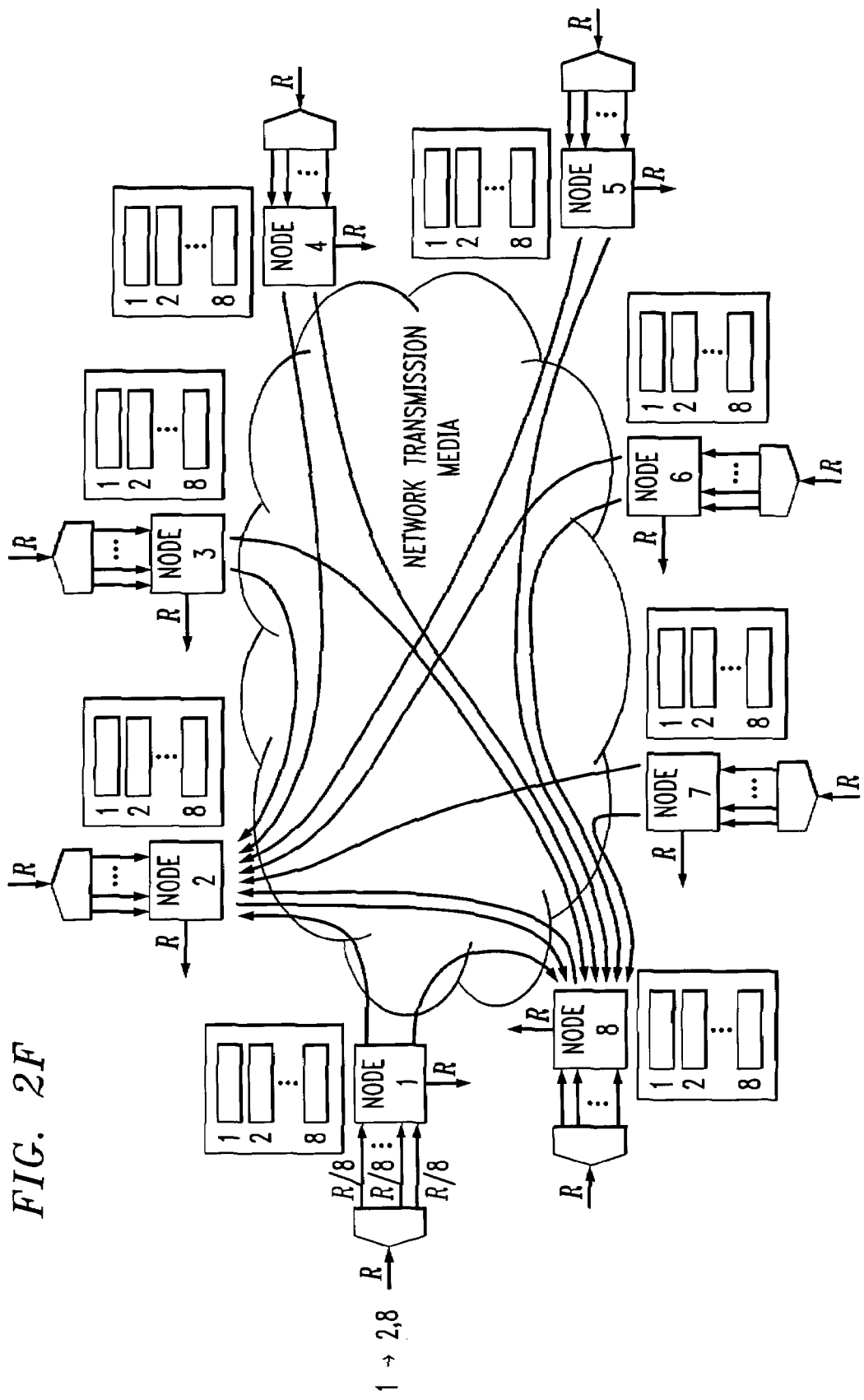

Once each of the parts has been distributed to its corresponding intermediate node, the parts are routed to the appropriate destination node or nodes. In this example, the destination nodes of the incoming packet flow are nodes 2 and 8. This routing process, as illustrated in FIG. 2E, generally involves each intermediate node examining destination addresses in packet headers of its received part, and storing the packets in appropriate resequencing buffers or VOQs, based on the destination addresses. As noted above, a given one of the sets of VOQs includes a separate queue for each of the eight nodes in this example. Since the destination nodes of the split flow are nodes 2 and 8, the VOQs corresponding to nodes 2 and 8 will store the packets of the various parts, based on packet header destination address. It can be seen in FIG. 2E that, in each of the sets of VOQs, the queues corresponding to nodes 2 and 8 contain packets based on the routing decision. FIG. 2F shows the routing of the packets from the sets of VOQs to the appropriate destination nodes 2 and 8.

It should be noted that those packets distributed to node 2 that have a final destination of node 2 are not enqueued in the corresponding VOQ, but are instead stored in a resequencing buffer of node 2. Similarly, those packets distributed to node 8 that have a final destination of node 8 are not enqueued in the corresponding VOQ, but are instead stored in a resequencing buffer of node 8.

It is to be appreciated that the particular arrangements of network elements and processing steps shown in FIGS. 1 and 2A-2F are presented by way of illustrative example only, and should not be construed as limiting the scope of the invention in any way. As indicated previously, the invention can be implemented using a wide variety of other network configurations and traffic flow processing operations.

An advantage of the illustrative embodiment over conventional arrangements is that each of N network nodes participating in the load balancing process for a rate-R flow receives a total amount of traffic flow corresponding to N times R/N=R. Thus, the required switching capacity of each node is fixed based on rate, and is not a function of N, which allows the architecture to be readily scaled to accommodate large mesh topologies. By way of contrast, a pure IP architecture for a similar configuration would require a switching capacity on the order of (N−1)R at each of the nodes. Also, bandwidth efficiency is improved relative to the IP overlay over SONET architecture, which requires, for a general ring topology of N nodes with unidirectional routing, an aggregate link bandwidth on the order of $N^2(N-1)R/2$.

The illustrative embodiment thus provides bandwidth efficiency without requiring high packet switching capacities at each node. Other advantages include improved security and reduced sensitivity to node or link failures, since each node receives only a 1/N portion of a given traffic flow. Also, since each packet is queued only once, the end-to-end delay in this architecture is bounded. Operationally, this architecture is well suited for service providers to gradually grow their networks in a phased manner, by including more nodes participating in the load balancing process.

Figure 3:
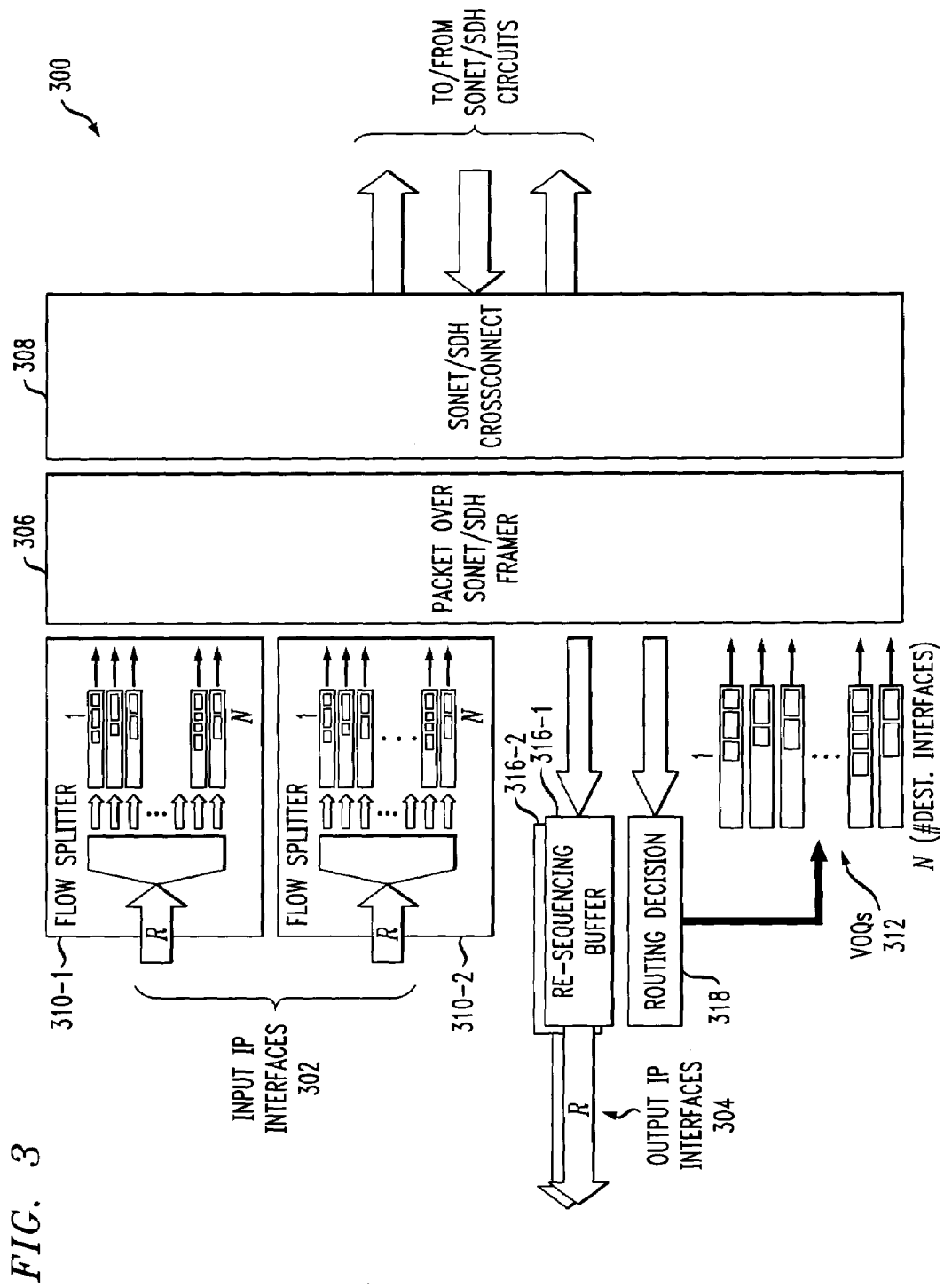
FIG. 3 shows an exemplary implementation of a network node suitable for implementing a load balancing process of the type described in conjunction with FIG. 1.

FIG. 3 shows an exemplary implementation of a particular one of the network nodes in a load-balanced network architecture in accordance with the invention. The node 300 may be viewed as representing, for example, one of the nodes 1, 2, . . . 8 in the network 200 previously described in conjunction with FIGS. 2A through 2F.

The node 300 includes multiple input IP interfaces 302 and multiple output IP interfaces 304, with each of the individual input or output interfaces being of rate R. Each of the input IP interfaces 302 has a flow splitter 310-1 or 310-2 associated therewith, and each of the output IP interfaces has a resequencing buffer 316-1 or 316-2 associated therewith. Although only two input IP interfaces and two output IP interfaces are shown, it should be understood that a given network node configured in accordance with the invention may include more or fewer interfaces, and the number of associated flow splitters or resequencing buffers would be adjusted accordingly.

Also included in the node 300 are a routing decision block 318 and a set of VOQs 312 arranged as shown. The set of VOQs 312 includes N separate queues, as was previously described in conjunction with FIGS. 2A through 2F, although other configurations may alternatively be used.

The node 300 further includes a number of SONET/SDH circuits, including a packet over SONET/SDH framer 306 and a SONET/SDH crossconnect 308, which communicate with one or more additional SONET/SDH circuits not explicitly shown. These and other SONET/SDH circuits utilizable in node 300 may be implemented in a conventional manner, and will not be further described herein.

At each of the input interfaces 302, a traffic flow of rate R is split into N different parts, in the manner described previously, utilizing flow splitter 310-1 or 310-2. Each of the individual parts is then mapped onto a corresponding pre-provisioned SONET circuit. Any packets received by the node 300 are first examined to determine whether or not they have reached their final destination. If node 300 is the final destination for a given packet, that packet is placed in the appropriate re-sequencing buffer 316-1 or 316-2 such that packets are permitted to leave the node in the same order in which they entered the network. If node 300 is an intermediate node not corresponding to the final destination for the given packet, the packet is placed in the appropriate queue in the set of VOQs 312. From the VOQ, the packet is routed via the corresponding SONET circuit to its destination node.

The particular node implementation shown in FIG. 3 is intended as an example of one possible network node that may be used in implementing the load-balanced network architecture in the illustrative embodiment previously described. Other types of node configurations may be used, as will be appreciated by those skilled in the art, and a given network may include many nodes with differing configurations.

Generally, a node may be configured so as to include a processor coupled to a memory. The processor may comprise a microprocessor, a microcontroller, a central processing unit (CPU), an application-specific integrated circuit (ASIC) or other type of processing device, as well as portions or combinations of such devices. The memory may include an electronic random access memory (RAM), a read-only memory (ROM) or other type of storage device, as well as portions or combinations of such devices. The memory may be used to store software that is executed by or otherwise utilized by the processor in implementing at least a portion of a load balancing process in accordance with the invention.

With reference again to the node 300 of FIG. 3, elements such as flow splitters 310, VOQs 312, resequencing buffers 316, and routing decision block 318 may be viewed as one possible implementation of a processor and associated memory. For example, routing decision block 318 may be viewed as an element of a processor coupled to a memory comprising VOQs 312.

The node 300 may be viewed as an example of what is more generally referred to herein as a "processing device." Such a processing device may be implemented in the form of one or more integrated circuits, as well as in the form of other types of hardware, software or firmware, in any combination.

It is to be appreciated that the network 200 and node 300 are considerably simplified for purposes of illustration, and may include other elements, not explicitly shown, that are commonly found in conventional networks or nodes.

Again, it should be emphasized that the above-described embodiments of the invention are intended to be illustrative only. For example, the particular steps of the load balancing process of FIG. 1, and the node and network configurations of FIGS. 2 and 3, may be varied in alternative embodiments. In addition, the invention may be applied to any routing application, without regard to the type, arrangement or configuration of the network, network nodes, or communication protocols. These and numerous other alternative embodiments within the scope of the following claims will be readily apparent to those skilled in the art.

We claim:

1. A method of processing a traffic flow in a communication network comprising a plurality of nodes, the method comprising the steps of:
    splitting the traffic flow at a given node into a plurality of parts; and
    distributing the parts from the given node to respective ones of the plurality of nodes that are designated as participating in a load balancing process for the traffic flow such that each participating node receives a corresponding one of the part from the given node;
    wherein each of at least a subset of the participating nodes receiving one of the parts from the given node routes at least a portion of its received part to one or more destination nodes of the plurality of nodes; and
    wherein at least a first one of the participating nodes receiving one of the parts from the given node routed at least a portion of its received part to at least a second one of the participating nodes receiving another one of the parts from the given node.

2. The method of claim 1 wherein the traffic flow comprises an incoming packet flow arriving at the given node.

3. The method of claim 1 wherein the traffic flow is split into the plurality of parts in a manner independent of the one or more destination nodes.

4. The method of claim 1 wherein the traffic flow is split into a plurality of substantially equal parts.

5. The method of claim 1 wherein the traffic flow is split into a plurality of parts at least two of which comprise non-equal parts.

6. The method of claim 1 wherein the traffic flow comprises virtually-concatenated data traffic.

7. The method of claim 1 wherein the traffic flow is split into N parts by maintaining N queues at the given node, and filling the queues from the traffic flow in accordance with a specified queue-filling technique.

8. The method of claim 7 wherein the specified queue-filling technique comprises one of a round-robin technique and a shortest queue first technique.

9. The method of claim 1 wherein the traffic flow is split into the plurality of parts utilizing a virtual concatenation technique.

10. The method of claim 1 wherein the traffic flow is split into the plurality of parts in such a manner that a desired packet format of the traffic flow is maintained in each of the plurality of parts.

11. The method of claim 1 wherein the parts of the traffic flow are distributed to the respective ones of the participating nodes over pre-provisioned circuits each configured to support a corresponding one of the parts.

12. The method of claim 1 wherein a given one of the participating nodes routes at least a portion of its received part to a set of destination nodes determined based on destination addresses in packet headers of the portion.

13. The method of claim 1 wherein if the packet header of a given packet in the part of the flow received by a given one of the participating nodes indicates that the participating node is a final destination node for that packet, the packet is stored in a resequencing buffer of the participating node.

14. The method of claim 1 wherein if the packet header of a given packet in the part of the flow received by a given one of the participating nodes indicates that the participating node is not a final destination node for that packet, the packet is stored in a particular one of a plurality of output queues of the participating node that is associated with the final destination node for the packet.

15. The method of claim 1 wherein at least one of the splitting step and the distributing step is implemented at least in part in software running on a processor of a node or other element of the network.

16. An apparatus for use in processing a traffic flow in a communication network comprising a plurality of nodes, the apparatus comprising:
    a processing device comprising a processor coupled to a memory, the processing device being operative to split the traffic flow at a given node into a plurality of parts, and to distribute the parts from the given node to respective ones of the plurality of nodes that are designated as participating in a load balancing process for the traffic flow such that each participating node receives a corresponding one of the parts from the given node;
    wherein each of at least a subset of the participating nodes receiving one of the parts from the given node routes at least a portion of its received part to one or more destination nodes of the plurality of nodes; and
    wherein at least a first one of the participating nodes receiving one of the parts from the given node routes at least a portion of its received part to at least a second one of the participating nodes receiving another one of the parts from the given node.

17. The apparatus of claim 16 wherein the processing device comprises one of the participating nodes of the network.

18. The apparatus of claim 16 wherein the processing device is implemented as one or more integrated circuits.

19. An article of manufacture comprising a machine-readable medium storing executable instructions for use in processing a traffic flow in a communication network comprising a plurality of nodes, the one or more instructions when executed in a processor implementing a method comprising the steps of:
    splitting the traffic flow at a given node into a plurality of parts; and
    distributing the parts from the given node to respective ones of the plurality of nodes that are designated as participating in a load balancing process for the traffic flow such that each participating node receives a corresponding one of the parts from the given node;
    wherein each of at least a subset of the participating nodes receiving one of the parts a given node routes at least a portion of its received part to one or more destination nodes of the plurality of nodes; and
    wherein at least a first one of the participating nodes receiving one of the parts from the given node routes at least a portion of its received part to at least a second one of the participating nodes receiving another one of the parts from the given node.

* * * * *

UNITED STATES PATENT AND TRADEMARK OFFICE
CERTIFICATE OF CORRECTION

PATENT NO. : 7,440,404 B2  
APPLICATION NO. : 10/785352  
DATED : October 21, 2008  
INVENTOR(S) : H. S. Nagesh et al.

Page 1 of 1

It is certified that error appears in the above-identified patent and that said Letters Patent is hereby corrected as shown below:

Claim 1, col. 7, line 15, please delete "part" and insert -- parts --.

Claim 1, col. 7, line 20, please delete "node" and insert -- nodes --.

Claim 1, col. 7, line 21, please delete "routed" and insert -- routes --.

Signed and Sealed this

Twentieth Day of January, 2009

JON W. DUDAS  
*Director of the United States Patent and Trademark Office*